US010728923B2

United States Patent
Li et al.

(10) Patent No.: US 10,728,923 B2
(45) Date of Patent: *Jul. 28, 2020

(54) METHOD AND APPARATUS OF CONFIGURING TIMING OF UPLINK TRANSMISSION

(71) Applicant: Samsung Electronics Co., Ltd., Suwon-si, Gyeonggi-do (KR)

(72) Inventors: Yingyang Li, Beijing (CN); Chengjun Sun, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/511,219

(22) Filed: Jul. 15, 2019

(65) Prior Publication Data

US 2019/0342908 A1 Nov. 7, 2019

Related U.S. Application Data

(63) Continuation of application No. 16/025,894, filed on Jul. 2, 2018, now Pat. No. 10,397,945, which is a (Continued)

(30) Foreign Application Priority Data

Jul. 30, 2013 (CN) .......................... 2013 1 0325414
Feb. 13, 2014 (CN) .......................... 2014 1 0050500

(51) Int. Cl.
*H01J 3/00* (2006.01)
*H04W 72/12* (2009.01)
(Continued)

(52) U.S. Cl.
CPC .......... *H04W 72/1289* (2013.01); *H04L 5/14* (2013.01); *H04W 56/0005* (2013.01); *H04W 56/0045* (2013.01); *H04W 74/0833* (2013.01)

(58) Field of Classification Search
CPC ......... H04W 56/0005; H04W 56/0045; H04W 74/0833; H04W 72/1289; H04L 5/14
(Continued)

(56) References Cited

U.S. PATENT DOCUMENTS

2011/0051633 A1  3/2011  Pan et al.
2011/0171949 A1  7/2011  Liao et al.
(Continued)

FOREIGN PATENT DOCUMENTS

CN   101646234 A   2/2010
CN   102118801 A   7/2011
(Continued)

OTHER PUBLICATIONS

International Search Report dated Nov. 7, 2014 in connection with International Application No. PCT/KR2014/006999; 7 pages.
(Continued)

*Primary Examiner* — Mang Hang Yeung

(57) ABSTRACT

The present disclosure is to provide a method of configuring timing of uplink (UL) transmission, comprising, receiving, by a user equipment (UE), configuration information on carrier aggregation (CA) of at least one frequency division duplex (FDD) cell and at least one time division duplex (TDD) cell; and adjusting, by the UE, starting timing of a UL subframe in a cell participating in the CA.

12 Claims, 2 Drawing Sheets

Related U.S. Application Data continuation of application No. 14/909,049, filed as application No. PCT/KR2014/006999 on Jul. 30, 2014, now Pat. No. 10,057,919.

(51) Int. Cl.
  *H04W 56/00* (2009.01)
  *H04L 5/14* (2006.01)
  *H04W 74/08* (2009.01)

(58) Field of Classification Search
  USPC .......................................................... 370/280
  See application file for complete search history.

(56) References Cited

U.S. PATENT DOCUMENTS

| | | | |
|---|---|---|---|
| 2012/0008600 A1 | 1/2012 | Marinier et al. | |
| 2012/0057490 A1 | 3/2012 | Park et al. | |
| 2012/0082038 A1 | 4/2012 | Xu et al. | |
| 2012/0263128 A1 | 10/2012 | Hu et al. | |
| 2013/0188473 A1* | 7/2013 | Dinan | H04W 56/0005 370/216 |
| 2013/0272232 A1 | 10/2013 | Dinan | |
| 2014/0050186 A1 | 2/2014 | Kim et al. | |
| 2014/0233535 A1 | 8/2014 | Zhao et al. | |
| 2014/0329555 A1 | 11/2014 | Gao et al. | |
| 2015/0333879 A1 | 11/2015 | Yang et al. | |
| 2016/0100374 A1* | 4/2016 | Choi | H04W 56/0015 370/331 |

FOREIGN PATENT DOCUMENTS

| | | |
|---|---|---|
| CN | 102572967 A | 7/2012 |
| CN | 102573030 A | 7/2012 |
| CN | 102833844 A | 12/2012 |
| WO | 2012109195 A2 | 8/2012 |
| WO | 2012153961 A2 | 11/2012 |
| WO | 2013035974 A1 | 3/2013 |
| WO | 2013095003 A1 | 6/2013 |

OTHER PUBLICATIONS

Written Opinion of the International Searching Authority dated Nov. 7, 2014 in connection with International Application No. PCT/KR2014/006999; 7 pages.
Foreign Communication From a Related Counterpart Application, European Application No. 148319213-1875, Extended European Search Report dated Mar. 2, 2017, 7 pages.
Office Action dated Jun. 5, 2018 in connection with Chinese Patent Application No. 201410050500.6, 22 pages.
The State Intellectual Property Office of the People's Republic of China, "The Third Office Action," Application No. CN 201410050500.6, dated Aug. 23, 2019, 15 pages.

* cited by examiner

METHOD AND APPARATUS OF CONFIGURING TIMING OF UPLINK TRANSMISSION

CROSS-REFERENCE TO RELATED APPLICATIONS

This application is a continuation of application Ser. No. 16/025,894, filed Jul. 2, 2018, which is a continuation of application Ser. No. 14/909,049, which is the National Stage of PCT/KR2014/006999, filed Jul. 30, 2014, now U.S. Pat. No. 10,057,919, which claims priority to Chinese Patent Application No. 201310325414.7, filed Jul. 30, 2013 and Chinese Patent Application No. 201410050500.6, filed Feb. 13, 2014, each of which are incorporated by reference into the present disclosure as if fully set forth herein.

BACKGROUND

1. Field

The present disclosure relates to wireless communications systems, and particularly, to a method and an apparatus of configuring timing for uplink transmission in a system where carrier aggregation (CA) is applied to both frequency division duplex (FDD) cells and time division duplex (TDD) cells.

2. Description of Related Art

3GPP LTE (Long-Term Evolution) systems support both FDD and TDD.

FIG. 1 is a schematic diagram illustrating a frame structure of an FDD system.

As shown in FIG. 1, in an FDD system, each radio frame (101) has a length of 10 ms, and includes 10 subframes. Each subframe (103) has a length of 1 ms, and contains two time slots (105) each of which lasts 0.5 ms, i.e., the k'th subframe contains time slot 2k and time slot 2k+1, k=0, 1, . . . , 9.

FIG. 2 is a schematic diagram illustrating a frame structure of a TDD system.

As shown in FIG. 2, in a TDD system, each radio frame (201) of 10 ms is divided into two equal half-frames each of which lasts 5 ms. Each half-frame (203) includes 8 time slots each of which lasts 0.5 ms, and 3 special fields, i.e. Downlink Pilot Time Slot (DwPTS) (211), Guarding Period (GP) (213) and Uplink Pilot Time Slot (UpPTS) (215). The 3 special fields altogether last 1 ms. Each subframe (205) is composed of two consecutive time slots (207), i.e., the k'th subframe includes time slot 2k and time slot 2k+1. A downlink transmission time interval (TTI) is defined in a subframe.

A TDD system supports 7 types of uplink/downlink (UL/DL) configurations, as shown in Table 1. In the table, D denotes a downlink subframe, U denotes an uplink subframe, S denotes a special subframe including the 3 special fields.

TABLE 1

LTE TDD UL/DL configuration

| Configuration serial number | Switch-point periodicity | Sub-frame ID | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The frame structures shown in FIG. 1 and FIG. 2 are ideal frame structures of LTE systems. In practice, a base station and a UE may have different timing for sending and receiving subframes due to propagation delay. In an FDD system, timing of UL/DL subframes of a base station are generally aligned. In a TDD system, a time interval is generally added between a UL subframe and a DL subframe to allow the base station to transit from a receiving state to a sending state. According to LTE TDD standards, the time interval is 20 us, i.e., timing for receiving a UL subframe by a base station is 20 us prior to ideal subframe timing.

FIG. 3 illustrates a method of determining starting timing of sending a UL subframe by a UE.

The UE takes timing of a DL signal received from the base station as a reference for determining UL starting timing. Due to propagation delay, the UE needs to advance the transmission of the UL signal by a certain time period to guarantee the UL signal of the UE satisfies a required timing relation when received by the base station. The time advance (TA) (301) of the UE is $(N_{TA}+N_{TA\ offset})\times T_S$ seconds. $T_S$ is a sampling interval obtained by using a sampling frequency of 30.72 MHz. In an FDD system, $N_{TA\ offset}$ equals 0, and the base station adjusts transmission TA of a UE by adjusting the value of $N_{TA}$ to make boundaries of UL subframes and DL subframes aligned at the base station. In a TDD system, $N_{TA\ offset}$ equals the value of 624, $N_{TA}$ is configured by the base station. The TA actually used by the UE is $(N_{TA}+N_{TA\ offset})\times T_S$ seconds, so that the timing of receiving the UL subframe at the base station is 20 us prior to the ideal timing of TDD subframes, which provides time for the base station to transit from receiving to sending.

In an LTE system, a UE triggers a random access process by sending a random access preamble signal when attempting to access the system. The UE determines starting timing of preambles of physical random access channel (PRACH) preamble formats 0-3 by taking $N_{TA}=0$. As such, for an FDD system, the starting timing of a PRACH preamble signal is directly obtained by using the timing for receiving DL signals from the base station; for a TDD system, the starting timing of a PRACH preamble signal is 20 us prior to timing for receiving DL signals from the base station. With respect to PRACH preamble signal format 4, the UE determines timing of the end position of the UpPTS time slot by taking $N_{TA}=0$, i.e., sending the preamble signal 4832 $T_S$ and 20 us prior to the timing of receiving DL signals from the base station.

In an LTE-A (LTE-advanced) system, multiple CC (component carriers) are aggregated to obtain larger working bandwidth, i.e., CA (carrier aggregation). The aggregated carriers constitute downlink and uplink links in the communication system, therefore larger transmission rates can be achieved. A base station may configure a UE to work in multiple Cells which include a Pcell (Primary Cell) and multiple Scells (Secondary Cell). According to LTE Release 11, it is configured that HARQ-ACK of all Cells that are configured to be received by the UE is fed back in a UL subframe in a Pcell.

According to LTE Release 11 specification, multiple Cells can only collaborate with each other through CA when they are working under the same duplexing mode. In order to further improve system performances, future studies focus on CA systems that support both aggregated FDD and aggregated TDD. But as illustrated above, FDD systems and TDD systems handle timing of uplink subframes differently, i.e., TDD systems uses an extra TA of 20 us compared to FDD systems. There is urgent need for finding a way to coordinate timing of uplink transmission of FDD Cells and TDD cells within a CA system.

SUMMARY

The present disclosure is to provide a method of configuring timing of uplink (UL) transmission, comprising, receiving, by a user equipment (UE), configuration information on carrier aggregation (CA) of at least one frequency division duplex (FDD) cell and at least one time division duplex (TDD) cell; and adjusting, by the UE, starting timing of a UL subframe in a cell participating in the CA. The present disclosure is to provide an apparatus, comprising: a configuring module and an adjusting module, wherein the configuring module is configured to receive configuration information, and performing carrier aggregation (CA) of frequency division duplex (FDD) cells and time division duplex (TDD) cells according to the configuration information; and the adjusting module is configured to adjust starting timing of a UL subframe in a cell participating in the CA.

The present disclosure is to provide a method enables UL subframes of multiple cells to have the same or similar starting timing in a CA system where CA is applied to both FDD cells and TDD cells. In an example, starting timing of UL subframes in an FDD cells may be adjusted to be consistent with or similar to that of a TDD cell. Thus, overlap of two successive subframes resulted from non-aligned timing can be reduced, system performances can be improved, and the CA system's capability of anti-timing-offset can also be enhanced. The performance improvements are only reflected in those UEs that support CA of both FDD cells and TDD cells.

DETAILED DESCRIPTION

Figure 1:
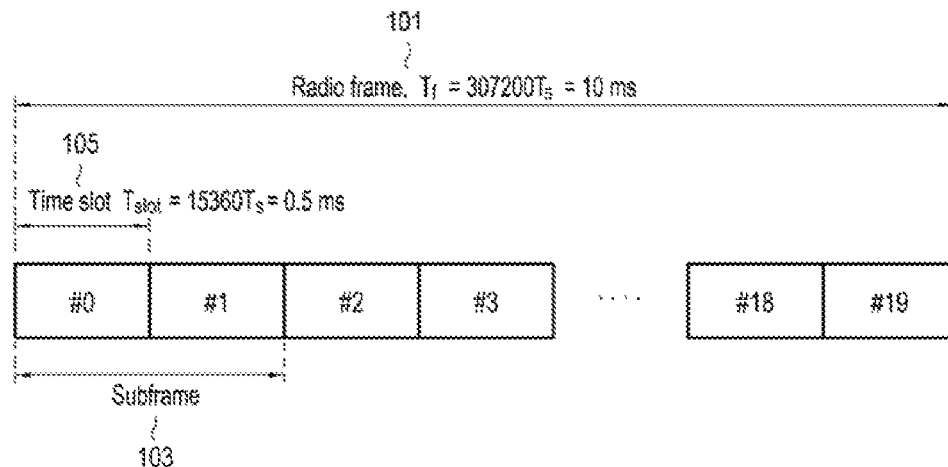
FIG. 1 is a schematic diagram illustrating a frame structure of an FDD system.
Figure 3:
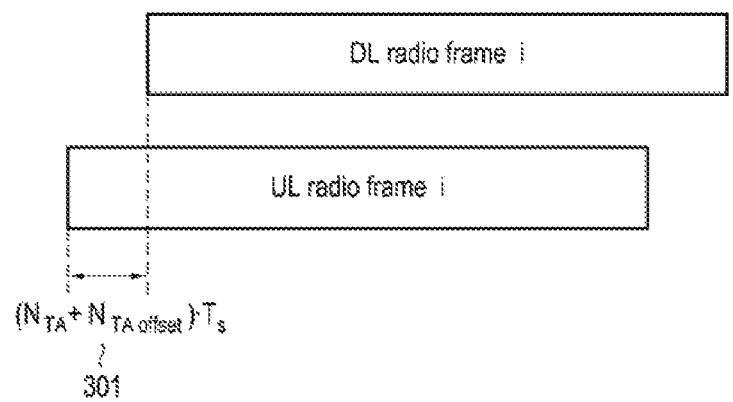
FIG. 3 is a schematic diagram illustrating TA.

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In an LTE system working in only one duplexing mode, the manner of handling starting timing of an UL subframe is related with the duplexing mode according to LTE standards.

In an FDD cell, starting timing of a UL subframe sent by a UE is $(N_{TA}+N_{TA\ offset})\times T_S$ seconds prior to starting timing of a DL subframe corresponding to the UL subframe received by the UE, and $N_{TA\ offset}=0$.

In a TDD cell, starting timing of an UL subframe sent by a UE is $(N_{TA}+N_{TA\ offset})\times T_S$ seconds prior to starting timing of a DL subframe corresponding to the UL subframe received by the UE, and $N_{TA\ offset}=624$. $N_{TA}$ denotes the TA configured by a base station for the UE.

During initial random access, a UE determines starting timing for sending a PRACH preamble signal by using $N_{TA}=0$. As such, the starting timing of UL subframes of the TDD system has an extra time advance (TA) of 20 us compared to that of the FDD system to enable the base station to transit between sending and receiving.

In a CA system where CA is applied to both FDD cells and TDD cells, if the manner defined in LTE Release 11 is re-used in each carrier, a UE may have a 20 us offset between the starting timing of an FDD cell and a TDD cell, thus starting timing of UL subframes are not aligned. The non-aligned timing results in overlap of two successive subframes in the CA system. But LTE Release 11 standards provide no mechanism for optimizing system performances when the overlap occurs. Generally, system performances can be improved by aligning starting timing of UL subframes in UL carriers of a UE. In a CA system, if starting timing of UL subframes of a UE in multiple cells are not aligned, LTE Release 11 standards support a maximum timing offset of 31.3 us amongst multiple cells for UL transmission. Since the maximum tolerable timing offset is only slightly larger than 20 us, the timing offset of 20 us can greatly impair the capabilities of anti-timing-offset of the system.

Based on the above analysis, the timing offset of UL subframes between FDD cells and TDD cells resulted in different duplexing modes adversely affect performances of a CA system where CA is applied to both FDD cells and TDD cells. To address the above issues, examples of the present disclosure provide a method of configuring timing of UL transmission in a system where CA is applied to both FDD cells and TDD cells.

Figure 4:
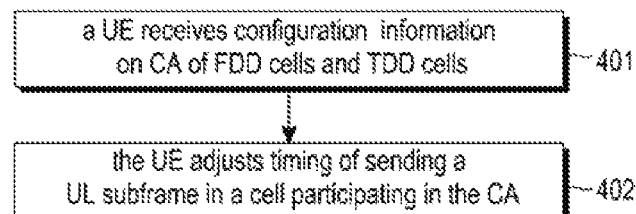
FIG. 4 is a flowchart illustrating a method of configuring timing of UL transmission in accordance with an example of the present disclosure.

FIG. 4 is a flowchart illustrating a method of configuring timing of UL transmission in accordance with an example of the present disclosure.

The method of the present disclosure may include the following procedures.

At block 401, a UE receives configuration information on carrier aggregation (CA) of at least one FDD cell and at least one TDD cell.

The configuration information may only specify that the system supports CA of both FDD cells and TDD cells. In another example, the configuration information may also include control information which is used for adjusting starting timing of UL subframes in cells. For example, the control information may be a parameter indicating a timing offset $N_{TA}^{offset}$. The control information for starting timing of UL subframes may be sent in FDD cells only, or may be sent in both FDD cells and TDD cells.

At block 402, the UE adjusts starting timing of a UL subframe in a cell participating in the CA.

The starting timing of uplink subframes in one or multiple cells that participate in CA may be different from starting timing defined in LTE Release 11 for uplink subframes under the same duplexing mode.

An example of the manner of handling TA may include: adding a TA of $N_{TA\ offset} \times T_S$ to starting timing defined in LTE Release 11 for UL subframes in FDD cells.

Given that the $N_{TA} \times T_S$ seconds refers to the TA configured for a UE when the cell conforms to LTE Release 11, the TA of a UE is $(N_{TA}+N_{TA\ offset}) \times T_S$ seconds in a CA system where CA is applied to both FDD cells and TDD cells. In an example, the TA configured by a base station for the UE may have already included the extra $N_{TA\ offset} \times T_S$ seconds, i.e., the base station may configure the TA of the UE to be $(N_{TA}+N_{TA\ offset}) \times T_S$ seconds. In another example, the base station may conform to LTE Release 11 and configure the TA of the UE to be $N_{TA} \times T_S$ seconds, and the UE adds $N_{TA\ offset} \times T_S$ seconds to the TA when performing UL transmission, i.e., the actual TA is $(N_{TA}+N_{TA\ offset}) \times T_S$ seconds.

In the above examples, the $N_{TA\ offset}$ may be a pre-defined value. Alternatively, the $N_{TA\ offset}$ may also be a value decided by the base station or a value decided using other mechanisms that do not involve exchange of higher-layer signaling when the base station configures a TA which has already included the $N_{TA\ offset} \times T_S$ seconds. The value of $N_{TA\ offset}$ can keep the maximum timing offset of UL transmissions between TDD cells and FDD cells consistent with that in LTE Release 11 CA systems. In an example, when $N_{TA\ offset}=624$, $N_{TA\ offset} \times T_S=20$ us, which enables starting timing of UL subframes in FDD cells to be consistent with that in TDD cells.

Another example of the manner of handling TA may include: making starting timing of a UL subframe of a UE $(N_{TA}+N_{TA}^{offset}) \times T_S$ seconds prior to starting timing of a DL subframe received by the UE in the cell based on control information for starting timing of UL subframes in the cell sent by the base station, e.g., a timing offset parameter $N_{TA}^{offset}$. In the example, $N_{TA} \times T_S$ denotes the TA configured for the UE when the cell conforms to LTE Release 11. In an example, the TA configured by a base station for the UE may have already included the extra $N_{TA}^{offset} \times T_S$ seconds, i.e., the base station may configure the TA of the UE to be $(N_{TA}+N_{TA}^{offset}) \times T_S$ seconds. In another example, the base station may conform to LTE Release 11 and configure the TA of the UE to be $N_{TA} \times T_S$ seconds, and the UE adds $N_{TA} \times T_S$ seconds to the TA during UL transmission, i.e., the actual TA is $(N_{TA}+N_{TA}^{offset}) \times T_S$ seconds.

The $N_{TA}^{offset}$ may be sent to all of UEs via broadcast signaling. Alternatively, the $N_{TA}^{offset}$ may be configured individually for each UE through radio resource control (RRC) signaling. The method may be applied to FDD cells only, i.e., adding $N_{TA}^{offset} \times T_S$ seconds to the starting timing of UL subframes specified in LTE Release 11 to adjust starting timing of UL subframes in FDD cells. Alternatively, the method may be applied to both FDD cells and TDD cells, i.e., using $N_{TA}^{offset}$ instead of $N_{TA\ offset}=624$ to generate an extra TA of $N_{TA}^{offset} \times T_S$ in TDD cells. The value of $N_{TA}^{offset}$ can keep the maximum timing offset of UL transmissions between TDD cells and FDD cells consistent with that in LTE Release 11 CA systems. In an example, when $N_{TA}^{offset}=624$, $N_{TA}^{offset} \times T_S=20$ us, which enables starting timing of UL subframes in FDD cells to be consistent with that in TDD cells.

The method as shown in FIG. 4 enables UL subframes of multiple cells to have the same or similar starting timing in a CA system where CA is applied to both FDD cells and TDD cells. In an example, starting timing of UL subframes in an FDD cells may be adjusted to be consistent with or similar to that of a TDD cell. Thus, overlap of two successive subframes resulted from non-aligned timing can be reduced, system performances can be improved, and the CA system's capability of anti-timing-offset can also be enhanced. The performance improvements are only reflected in those UEs that support CA of both FDD cells and TDD cells.

The following are a few examples of adjusting starting timing of UL subframes in cells.

Example One

According to the above analysis, timing of a base station receiving UL subframes in a cell may be adjusted in a CA system where CA is applied to both FDD cells and TDD cells to make starting timing of UL subframes of a UE in FDD cells and TDD cells become consistent with or close to each other. Suppose a UE works only in one of the cells. Since timing of UL subframes in a cell has been adjusted on the basis of the timing specified in LTE Release 11 for the same duplexing mode, starting timing of UL subframes of a UE needs to be adjusted accordingly to improve system performance.

Taking the random access process in an FDD system as an example, if a UE still follows the random access process as defined in LTE Release 11, performances of the random access may be dissatisfactory. Suppose PRACH format 0 is configured, the CP length is $3168 \cdot T_S$, an effective preamble sequence has a length of $24576 \cdot T_S$, and the guarding period following the random access preamble is $2976 \cdot T_S$, i.e., approximately 97 us. The PRACH format 0 can support a maximum cell coverage radius of 14.5 km. In a CA system where CA is applied to both FDD cells and TDD cells, suppose the timing of receiving UL subframes in an FDD cell has been advanced by 20 us to be consistent with the timing of UL subframes in a TDD cell. If a UE determines starting timing of a PRACH preamble in the FDD cell still using the manner defined for an LTE single carrier system, this situation equivalent to that the guarding period following the random access preamble is reduced by 20 us, i.e., the maximum cell coverage radius of the PRACH format 0 is reduced by 3 km, i.e., 11.5 km.

In the CA system where CA is applied to both FDD cells and TDD cells, when a UE works in only one cell, the cell may be an FDD cell or a TDD cell. In an example, a solution may include making starting timing of an UL subframe to be sent by the UE $(N_{TA}+N_{TA\ offset})\times T_S$ seconds prior to the starting timing of a DL subframe received by the UE from the cell at block 402.

The $N_{TA}\times T_S$ denotes the TA configured for the UE when the cell conforms to LTE Release 11. The $N_{TA\ offset}\times T_S$ offset S denotes an additional TA to be added to the cell obtained by using the first manner of handling TA in block 402, e.g., $N_{TA\ offset}=624$. The $N_{TA}\times T_S$ denotes the TA configured for the UE when the cell conforms to LTE Release 11. In an example, the base station may configure a TA for the UE which has already included the extra $N_{TA\ offset}\times T_S$ seconds, i.e., the base station may configure the TA of the UE to be $(N_{TA}+N_{TA\ offset})\times T_S$ seconds. In another example, the base station conforms to LTE Release 11 and configures the TA of the UE to be $N_{TA}\times T_S$ seconds, and the UE adds $N_{TA\ offset}\times T_S$ seconds to the TA during UL transmission, i.e., the actual TA is $(N_{TA}+N_{TA\ offset})\times T_S$ seconds. In an example, the UE may use N during an initial random access process, i.e., for the mechanism where it is pre-defined that $T_{TA\ offset}=624$, the starting timing for sending the PRACH pre-amble signal may be determined to be $N_{TA\ offset}\times T_S=20$ us prior to the starting timing of a DL subframe received by the UE from the cell. As such, the cell coverage of the PRACH pre-amble signal can be maintained unchanged.

In the CA system where CA is applied to both FDD cells and TDD cells, another method may include configuring a timing offset parameter $N_{TA}^{offset}$ for the cell at block 401. $N_{TA}^{offset}\times T_S$ denotes the TA to be added to the cell obtained by using the second manner of handling TA in block 402. The $N_{TA}^{offset}$ may be sent via broadcast signaling, or may be sent to each UE via RRC signaling. In an example, the base station may configured a TA for the UE which has already included the extra $N_{TA}^{offset}\times T_S$ seconds, i.e., the base station may configure the TA of the UE to be $(N_{TA}+N_{TA}^{offset})\times T_S$ seconds. In another example, the base station conforms to LTE Release 11 and configures the TA of the UE to be $N_{TA}\times T_S$ seconds, and the UE adds $N_{TA}^{offset}\times T_S$ seconds to the TA during UL transmission, i.e., the actual TA is $(N_{TA}+N_{TA}^{offset})\times T_S$ seconds. The $N_{TA}^{offset}$ may be configured for FDD cells only, or be configured for all of cells regardless of duplexing modes.

When a UE works only in a cell that has configured with $N_{TA}^{offset}$, if the $N_{TA}^{offset}$ is configured for the cell via broadcast signaling in block 402, the UE may take the $N_{TA}^{offset}$ into consideration when performing random access and transmitting other UL data and control information, i.e., the starting timing of UL subframes sent by the UE is $(N_{TA}+N_{TA}^{offset})\times T_S$ seconds prior to the starting timing of DL subframes received by the UE from the cell. The $N_{TA}\times T_S$ denotes the TA configured for the UE when the cell conforms to LTE Release 11. During random access, $N_{TA}=0$, and the UE determines the TA of the random access preamble signal is $N_{TA}^{offset}\times T_S$ based on the configured parameter $N_{TA}^{offset}$. As such, the cell coverage supported by the PRACH preamble signal can be maintained unchanged, and transmission performances of other UL data and control information are also guaranteed.

When the UE works only in one cell that has configured with $N_{TA}^{offset}$, if the $N_{TA}^{offset}$ is configured for the cell via RRC signaling in block 402, the UE only takes the $N_{TA}^{offset}$ into consideration during transmission of UL data and control information after the UE has accessed the cell in the system, i.e., starting timing of UL subframes sent by the UE is $(N_{TA}+N_{TA}^{offset})\times T_S$ seconds prior to starting timing of DL subframes received by the UE from the cell. This guarantees transmission performances of UL data and control information.

Example Two

In a CA system where CA is applied to both FDD cells and TDD cells, timing of a base station receiving UL subframes in a cell may be adjusted to make starting timing of UL subframes of a UE in FDD cells and TDD cells become consistent with or close to each other. Suppose a UE has accessed a cell in the CA system, and the cell is a Pcell. When the UE needs to be configured to work in another cell, e.g., an Scell, starting timing of an UL subframe of the UE also needs to be adjusted to guarantee system performances.

There are three situations.

In the first possible situation, suppose the Scell newly added belongs to a TA group (TAG) to which the Pcell belongs, UL transmission in the Scell uses the same TA with that used in the Pcell. The Scell may be an FDD cell or a TDD cell. $N_{TA}\times T_S$ denotes the TA configured for the UE when the Pcell conforms to LTE Release 11.

Supposing the Pcell is an FDD cell and starting timing of a UL subframe of the UE in the Pcell is $(N_{TA}+N_{TA\ offset})\times T_S$ seconds (e.g., $N_{TA\ offset}=0$) prior to starting timing of a DL subframe received by the UE in the Pcell according a timing mechanism specified in LTE Release 11, starting timing of a UL subframe of the UE in the newly added Scell is $(N_{TA}+N_{TA\ offset})\times T_S=N_{TA}\times T_S$ seconds prior to starting timing of the DL subframe received by the UE from the Pcell.

In another example, supposing the Pcell is an FDD cell and starting timing of a UL subframe of the UE in the Pcell is $(N_{TA}+N_{TA\ offset})\times T_S$ seconds (e.g., $N_{TA\ offset}\times T_S=20$ us) prior to starting timing of a DL subframe received by the UE in the Pcell, starting timing of a UL subframe of the UE in the Scell is $(N_{TA}+N_{TA\ offset})\times T_S$ seconds prior to starting timing of the DL subframe received by the UE from the Pcell. $N_{TA\ offset}\times T_S$ denotes the TA to be added to the Pcell obtained by using the first manner of handling TA in block 402. In an example, the base station may configured a TA for the UE which has already included the extra $N_{TA\ offset}\times T_S$ seconds, i.e., the base station may configure the TA of the UE to be $(N_{TA}+N_{TA\ offset})\times T_S$ seconds. In another example, the base station conforms to LTE Release 11 and configures the TA of the UE to be $N_{TA}\times T_S$ seconds, and the UE adds $N_{TA\ offset}\times T_S$ seconds to the TA during UL transmission, i.e., the actual TA is $(N_{TA}+N_{TA\ offset})\times T_S$ seconds.

In yet another example, supposing the Pcell is an FDD cell and starting timing of a UL subframe of the UE in the Pcell is determined by using a timing offset parameter $N_{TA}^{offset}$ which is sent through broadcast signaling or via RRC signaling, i.e., starting timing of the UL subframe of the UE is $(N_{TA}+N_{TA}^{offset})\times T_S$ seconds prior to the starting timing of a DL subframe received by the UE from the Pcell, starting timing of the UE in the Scell may be $(N_{TA}+N_{TA}^{offset})\times T_S$ seconds prior to the starting timing of the DL subframe received by the UE from the Pcell. The $N_{TA}^{offset}\times T_S$ denotes the TA to be added to the Pcell obtained by using the second manner of handling TA in block 402. In an example, the base station may configured a TA for the UE which has already included the extra $N_{TA}^{offset} \times T_S$ seconds, i.e., the base station may configure the TA of the UE to be $(N_{TA}+N_{TA}^{offset}) \times T_S$ seconds. In another example, the base station conforms to LTE Release 11 and configures the TA of the UE to be $N_{TA} \times T_S$ seconds, and the UE adds $N_{TA}^{offset} \times T_S$ seconds to the TA during UL transmission, i.e., the actual TA is $(N_{TA}+N_{TA}^{offset}) \times T_S$ seconds.

Supposing the Pcell is a TDD cell and starting timing of a UL subframe of the UE in the Pcell is $(N_{TA}+N_{TA}^{offset}) \times T_S$ seconds (e.g., $N_{TA\ offset}$=624) prior to starting timing of a DL subframe received by the UE from the Pcell according a timing mechanism specified in LTE Release 11, starting timing of a UL subframe of the UE in the Scell may be $(N_{TA}+N_{TA\ offset}) \times T_S$ seconds prior to the starting timing of the DL subframe received by the UE from the Pcell. The $N_{TA\ offset} \times T_S$ denotes the TA to be added to the Pcell obtained by using the first manner of handling TA in block 402. In an example, the base station may configured a TA for the UE which has already included the extra $N_{TA\ offset} \times T_S$ seconds, i.e., the base station may configure the TA of the UE to be $(N_{TA}+N_{TA\ offset}) \times T_S$ seconds. In another example, the base station conforms to LTE Release 11 and configures the TA of the UE to be $N_{TA} \times T_S$ seconds, and the UE adds $N_{TA\ offset} \times T_S$ seconds to the TA during UL transmission, i.e., the actual TA is $(N_{TA}+N_{TA\ offset}) \times T_S$ seconds.

In still another example, supposing the Pcell is a TDD cell and starting timing of a UL subframe of the UE in the Pcell is determined by using a timing offset parameter $N_{TA}^{offset}$ which is sent through broadcast signaling or via RRC signaling, i.e., starting timing of the UL subframe of the UE is $(N_{TA}+N_{TA}^{offset}) \times T_S$ seconds prior to the starting timing of a DL subframe received by the UE from the Pcell, starting timing of the UE in the Scell may be $(N_{TA}+N_{TA}^{offset}) \times T_S$ seconds prior to the starting timing of the DL subframe received by the UE from the Pcell. The $N_{TA}^{offset} \times T_S$ the TA to be added to the Pcell obtained by using the second manner of handling TA in block 402. In an example, the base station may configured a TA for the UE which has already included the extra $N_{TA}^{offset} \times T_S$ seconds, i.e., the base station may configure the TA of the UE to be $(N_{TA}+N_{TA}^{offset}) \times T_S$ seconds. In another example, the base station conforms to LTE Release 11 and configures the TA of the UE to be $N_{TA} \times T_S$ seconds, and the UE adds $N_{TA}^{offset} \times T_S$ seconds to the TA during UL transmission, i.e., the actual TA is $(N_{TA}+N_{TA}^{offset}) \times T_S$ seconds.

In the second possible situation, supposing the newly added Scell does not belong to the TAG to which the Pcell belongs, the Scell may be an FDD cell or a TDD cell, and a TAG to which the Scell belongs has already include at least one another Scell, starting timing of a UL subframe in the Scell may be determined according to starting timing of UL subframes in a second Scell which is used for determining UL timing in the TAG to which the Scell belongs. The process is similar to the above method for determining starting timing of UL subframes according to the Pcell with the Pcell in the above method replaced with the second Scell for determining UL timing in the TAG. The $N_{TA} \times T_S$ denotes the TA configured for the UE when the second Scell for determining UL timing conforms to LTE Release 11, the $N_{TA\ offset} \times T_S$ denotes the extra TA added to the second Scell, and the $N_{TA}^{offset}$ denotes control information for starting timing of UL subframes sent by the second Scell.

In the third possible situation, supposing the newly added Scell does not belong to the TAG to which the Pcell belongs and the Scell is the first Scell (: first and only member) in a TAG to which the Scell belongs, the base station needs to trigger the UE to perform random access in the Scell to obtain TA needed by the UE, and thus control UL transmission of the UE in the Scell. The Scell may be an FDD cell or a TDD cell. $N_{TA} \times T_S$ denotes the TA configured for the UE when the newly added Scell conforms to LTE Release 11.

In this third situation, one of possible manners is to make starting timing of a UL subframe of the UE ($N_{TA}$+ $N_{TA\ offset}) \times T_S$ seconds (e.g., $N_{TA\ offset}$=624) prior to starting timing of a DL subframe received by the UE from the Scell in block 402. The $N_{TA\ offset} \times T_S$ denotes the TA to be added to the Scell obtained by using the first manner of handling TA in block 402. In an example, the base station may configured a TA for the UE which has already included the extra $N_{TA\ offset} \times T_S$ seconds, i.e., the base station may configure the TA of the UE to be $(N_{TA}+N_{TA\ offset}) \times T_S$ seconds. In another example, the base station conforms to LTE Release 11 and configures the TA of the UE to be $N_{TA} \times T_S$ seconds, and the UE adds $N_{TA\ offset} \times T_S$ seconds to the TA during UL transmission, i.e., the actual TA is $(N_{TA}+N_{TA\ offset}) \times T_S$ seconds. In an example, the UE may use $N_{TA\ offset}$=624 during an initial random access process, i.e., compared to the mechanism where it is pre-defined that $N_{TA}$=0, the starting timing for sending the PRACH preamble signal may be determined to be $N_{TA\ offset} \times T_S$=20 us prior to the starting timing of a DL subframe received by the UE from the Scell. As such, the cell coverage of the PRACH preamble signal can be maintained unchanged.

Another possible manner may include configuring a timing offset parameter $N_{TA}^{offset}$ for the Scell in block 401. The $N_{TA}^{offset} \times T_S$ denotes the TA to be added to the Scell obtained by using the second manner of handling TA in block 402. The $N_{TA}^{offset}$ may be sent in broadcast signaling of the Scell, or sent to each UE via RRC signaling in the Scell. In an example, the $N_{TA}^{offset}$ may be sent via RRC signaling sent by a Pcell for configuring the Scell.

At block 402, if the $N_{TA}^{offset}$ is sent by the Pcell through RRC signaling for configuring the Scell, the UE may take the $N_{TA}^{offset}$ into consideration when performing random access and transmitting other UL data and control information, i.e., starting timing of a UL subframe of the UE is $(N_{TA}+N_{TA}^{offset}) \times T_S$ seconds prior to starting timing of a DL subframe received by the UE from the Scell. In an example, the base station may configured a TA for the UE which has already included the extra $N_{TA}^{offset} \times T_S$ seconds, i.e., the base station may configure the TA of the UE to be $(N_{TA}+ N_{TA}^{offset}) \times T_S$ seconds. In another example, the base station conforms to LTE Release 11 and configures the TA of the UE to be $N_{TA} \times T_S$ seconds, and the UE adds $N_{TA}^{offset} \times T_S$ seconds to the TA during UL transmission, i.e., the actual TA is $(N_{TA}+N_{TA}^{offset}) \times T_S$ seconds. During random access, $N_{TA}$=0, and the UE determines the TA of the random access preamble signal is $N_{TA}^{offset} \times T_S$ based on the configured parameter $N_{TA}^{offset}$. As such, the cell coverage supported by the PRACH preamble signal can be maintained unchanged, and transmission performances of other UL data and control information are also guaranteed.

In another example, at block 402, if the is sent $N_{TA}^{offset}$ in the Scell through broadcast signaling, the UE may take the $N_{TA}^{offset}$ into consideration when performing random access and transmitting other UL data and control information, i.e., starting timing of a UL subframe of the UE is $(N_{TA}+ N_{TA}^{offset}) \times T_S$ seconds prior to starting timing of a DL subframe received by the UE from the Scell. In an example, the base station may configured a TA for the UE which has already included the extra $N_{TA}^{offset} \times T_S$ seconds, i.e., the base station may configure the TA of the UE to be $(N_{TA}+ N_{TA}^{offset}) \times T_S$ seconds. In another example, the base station conforms to LTE Release 11 and configures the TA of the UE to be $N_{TA} \times T_S$ seconds, and the UE adds $N_{TA}^{offset} \times T_S$ seconds to the TA during UL transmission, i.e., the actual TA is $(N_{TA}+N_{TA}^{offset}) \times T_S$ seconds. During random access, $N_{TA}=0$, and the UE determines the TA of the random access preamble signal is $N_{TA}^{offset} \times T_S$ based on the configured parameter $N_{TA}^{offset}$. As such, the cell coverage supported by the PRACH preamble signal can be maintained unchanged, and transmission performances of other UL data and control information are also guaranteed.

In another example, at block 402, if the is $N_{TA}^{offset}$ sent in the Scell through RRC signaling, the UE may take the $N_{TA}^{offset}$ into consideration when transmitting other UL data and control information after the UE has accessed the Scell in the system, i.e., starting timing of a UL subframe of the UE is $(N_{TA}+N_{TA}^{offset}) \times T_S$ seconds prior to starting timing of a DL subframe received by the UE from the Scell. This guarantees transmission performances of UL data and control information. In an example, the base station may configured a TA for the UE which has already included the extra $N_{TA}^{offset} \times T_S$ seconds, i.e., the base station may configure the TA of the UE to be $(N_{TA}+N_{TA}^{offset}) \times T_S$ seconds. In another example, the base station conforms to LTE Release 11 and configures the TA of the UE to be $N_{TA} \times T_S$ seconds, and the UE adds $N_{TA}^{offset} \times T_S$ seconds to the TA during UL transmission, i.e., the actual TA is $(N_{TA}+N_{TA}^{offset}) \times T_S$ seconds.

Corresponding to the above method, examples of the present disclosure also provide an apparatus.

Figure 5:
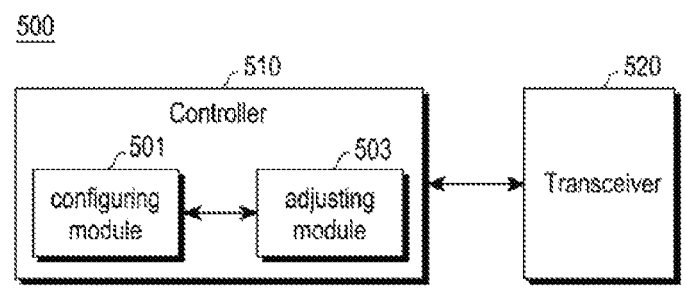
FIG. 5 is a schematic diagram illustrating modules of an apparatus in accordance with an example of the present disclosure.
Figure 2:
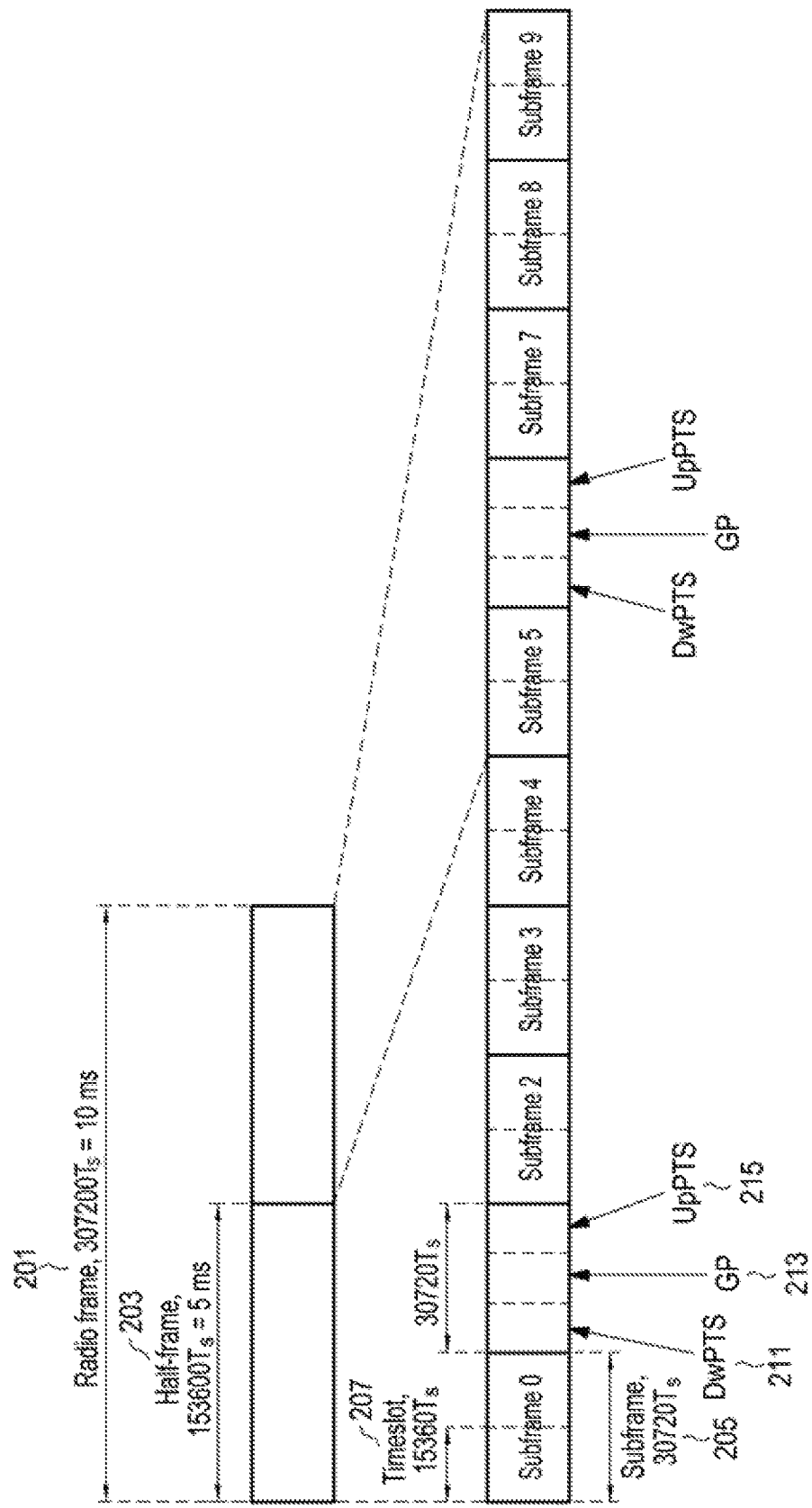
FIG. 2 is a schematic diagram illustrating a frame structure of a TDD system.

FIG. 5 is a schematic diagram illustrating modules of the apparatus in accordance with an example of the present disclosure.

An apparatus (500) includes a transceiver (520) that transmits and receives various signals and a controller (510) that controls transmission and reception of a control channel and a communication signal through the transceiver (520). The controller (510) generally controls operations of the method described in FIG. 4 as well as the control of the transceiver 520. Accordingly, performance of any operation by the apparatus can be equally understood as performance of any operation by the controller (510) of the apparatus in the specification.

Although the transceiver (520) and the controller (510) may be implemented by separated modules, such as a Radio Frequency (RF) module and a processor, it should be noted that they can be implemented by a single module.

The controller (510) may include a configuring module (501) and an adjusting module (503).

The configuring module (501) is configured to receive configuration information, and performing carrier aggregation (CA) of frequency division duplex (FDD) cells and time division duplex (TDD) cells by using the configuration information, and the adjusting module (503) is configured to adjust starting timing of a UL subframe in a cell participating in the CA.

The controller (510) may include a processor and a memory, and the memory may store the communication signal transmitting/receiving operation in a form of instructions which can be read and executed by the processor.

The components of the apparatus, modules and the like used in the disclosure may operate by using a hardware circuit, for example, a combination of a complementary metal oxide semiconductor based logical circuit, firmware, software and/or hardware, and a combination of firmware and/or software inserted into a machine-readable medium. As an example, various electric configurations and methods may be carried out by using electric circuits such as transistors, logic gates, and an Application Specific Integrated Circuit (ASIC).

What is claimed is:

1. A method of configuring timing of an uplink (UL) transmission of a carrier aggregation (CA) system, the method comprising:
    obtaining, by a user equipment (UE), information related to a time advance offset for the CA system;
    receiving, by the UE, information on a timing advance for the CA system that includes a first cell and a second cell, wherein the information on the timing advance is configured by a base station (BS) for the first cell;
    adjusting, by the UE, a starting timing of a UL subframe in the second cell participating in the CA system based on the time advance offset and the information on the timing advance; and
    transmitting data based on the adjusted starting timing of the UL subframe,
    wherein the time advance offset is applied for a random access process.

2. The method of claim 1, wherein adjusting, by the UE, the starting timing of the UL subframe in the second cell comprises:
    making the starting timing of the UL subframe in the second cell (the information on the timing advance+the time advance offset)*(a timing unit) seconds prior to a starting timing of a downlink (DL) subframe in the second cell in a time advance group (TAG) to which the first cell belongs.

3. The method of claim 1, wherein the information related to the time advance offset is obtained from a radio resource control (RRC) signal sent by the first cell.

4. The method of claim 1, wherein the information related to the time advance offset is obtained from a radio resource control (RRC) signal sent by the second cell.

5. The method of claim 1, wherein a starting timing of a UL subframe in the first cell participating in the CA system is adjusted by using the time advance offset and the information on the timing advance.

6. The method of claim 1, wherein the time advance offset is pre-defined.

7. An apparatus comprising:
    a transceiver coupled to at least one processor; and
    a memory coupled to the at least one processor,
    the at least one processor configured to:
        obtain information related to a time advance offset for a carrier aggregation (CA) system,
        receive information on a timing advance for the CA system that includes a first cell and a second cell, wherein the information on the timing advance is configured by a base station (BS) for the first cell,
        adjust a starting timing of a UL subframe in the second cell participating in the CA system based on the time advance offset and the information on the timing advance, and
        transmit data based on the adjusted starting timing of the UL subframe,
        wherein the timing advance offset is applied for a random access process.

8. The apparatus of claim 7,
    wherein the at least one processor is configured to make the starting timing of the UL subframe in the second cell (the information on the timing advance+the time advance offset)*(a timing unit) seconds prior to a starting timing of a downlink (DL) subframe in the second cell in a time advance group (TAG) to which the first cell belongs.

9. The apparatus of claim 7, wherein the information related to the time advance offset is obtained from a radio resource control (RRC) signal sent by the first cell.

10. The apparatus of claim 7, wherein the information related to the time advance offset is obtained from a radio resource control (RRC) signal sent by the second cell.

11. The apparatus of claim 7, wherein a starting timing of a UL subframe in the first cell participating in the CA system is adjusted by using the time advance offset and the information on the timing advance.

12. The apparatus of claim 7, wherein the time advance offset is pre-defined.

\* \* \* \* \*